Figure 3:
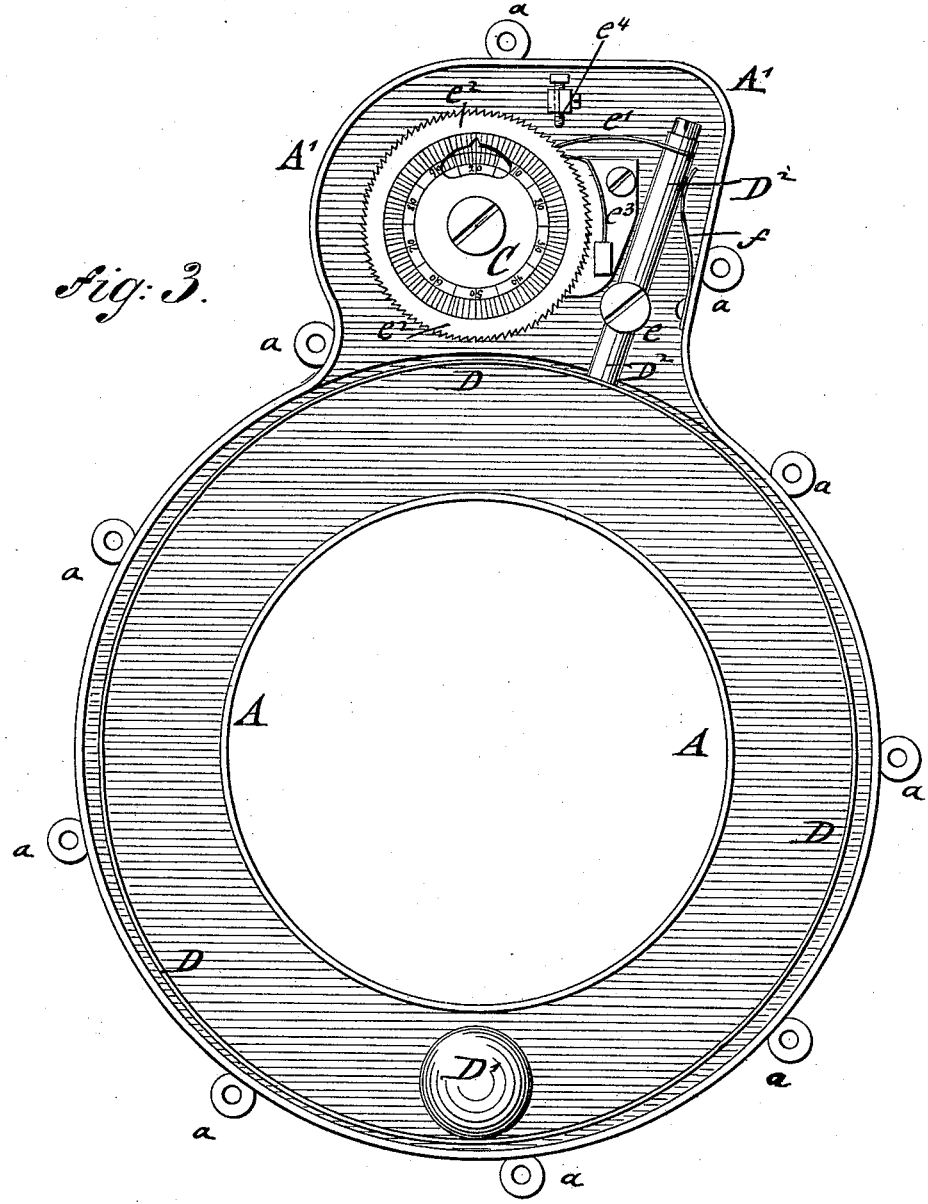

(No Model.) 2 Sheets—Sheet 1.
J. PAOLI.
ODOMETER.
No. 442,388. Patented Dec. 9, 1890.
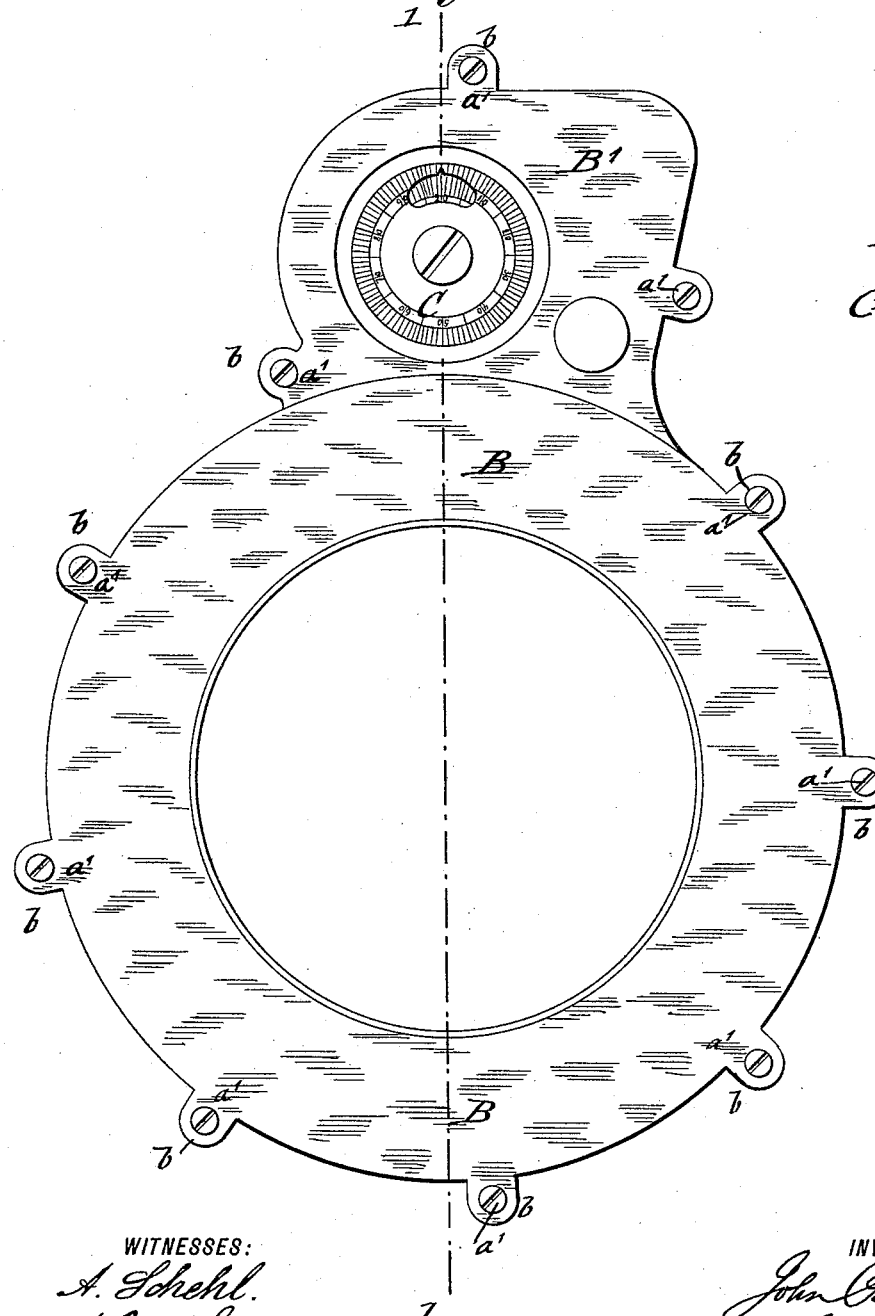
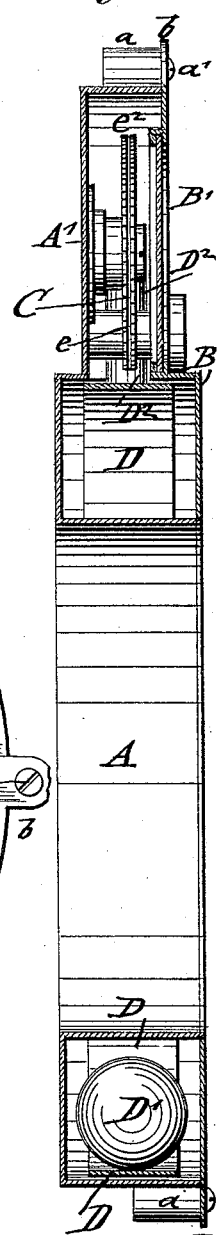
WITNESSES:
A. Schehl.
W. Reimler
INVENTOR
John Paoli
BY Gospel Raegener
ATTORNEYS.

(No Model.) 2 Sheets—Sheet 2.

J. PAOLI.
ODOMETER.

No. 442,388. Patented Dec. 9, 1890.

WITNESSES:
A. Schehl.
W. Reimherr

INVENTOR
John Paoli
BY
Goepel & Raegener
ATTORNEYS.

UNITED STATES PATENT OFFICE.

JOHN PAOLI, OF HOBOKEN, NEW JERSEY.

ODOMETER.

SPECIFICATION forming part of Letters Patent No. 442,388, dated December 9, 1890.

Application filed April 10, 1890. Serial No. 347,344. (No model.)

*To all whom it may concern:*

Be it known that I, JOHN PAOLI, of Hoboken, in the county of Hudson and State of New Jersey, a citizen of the Kingdom of Italy, have invented certain new and useful Improvements in Odometers, of which the following is a specification.

This invention relates to an improved odometer or instrument for measuring the distances over which a vehicle travels to which the odometer is applied, said instrument registering in an accurate manner the number of rotations which the wheel or other rotatory body to which the odometer is applied makes by passing over the distance to be measured; and the invention consists of an odometer which comprises a ring-shaped casing that is attached to the hub of the wheel or other rotatory body, a loose ring located inside of the casing, a ball interposed between the inner circumference of the casing and the loose ring, an arm attached to said ring and fulcrumed to the casing, and a counter operated by a pawl-and-ratchet mechanism connected to said arm and counter, according to the oscillations imparted to the loose ring by the action of the ball on the same, as will be fully described hereinafter, and finally pointed out in the claims.

In the accompanying drawings, Figure 1 represents a side elevation of my improved odometer. Fig. 2 is a vertical transverse section of the same on the line 1 1, Fig. 1; and Fig. 3 is also a side elevation with the top plate removed to show the interior parts of the instrument.

Similar letters of reference indicate corresponding parts.

Referring to the drawings, A represents a ring-shaped casing, and B the lid of the same, which is provided with lugs $b$, that register with the perforated sockets $a$ of the casing A, so that the lid B can be firmly secured to the casing A by means of screws $a'$, that are passed through the ears into the sockets. A rubber gasket is preferably interposed between the casing A and lid B for making the joint between these parts dust and water tight.

The casing A and lid B are provided with an extension $A'$ $B'$, in which a counter C is arranged.

In the ring-shaped casing A is located a loose ring D, and between the same and the inner circumference of the casing is placed a weighted ball $D'$, which imparts an oscillating motion to the ring.

The casing A is applied to the hub of a wheel or other rotatory body, and as the casing turns with said hub the ball follows the motion of the hub and causes the shifting of the ring within the casing, so as to impart an oscillating motion to an arm $D^2$, that is attached to the ring D and applied to a fulcrum $e$, located in the extension $A'$ $B'$ of the casing, as shown clearly in Fig. 3. The outer end of the fixed arm $D^2$ of the ring D is also acted upon by a spring $f$, by which the arm is forced toward the counting device C, so that a spring-pawl $e'$ on the arm is kept in mesh with two adjoining ratchet-wheels $e^2$, of which one is provided with ninety-nine and the other is provided with one hundred teeth. Below the pawl $e'$ a check-pawl $e^3$ is arranged, and above the same an adjustable screw-stop $e^4$, by which the extent of oscillating motion of the spring-pawl $e'$ is regulated. The ratchet-wheels $e^2$ are provided with suitable graduations, one ratchet-wheel having an opening to read off the graduation of the second ratchet-wheel, so as to determine thereby, in connection with the fixed index or pointer, the number of rotations which the wheel or other rotatory body has made. The counting device operates in the manner well known in differential gears, the second ratchet-wheel being carried along for the distance of one tooth when the first ratchet-wheel has been actuated ninety-nine times by the pawl and has completed one full revolution.

The advantages of my improved odometer are that the same can be readily applied to the hub of the vehicle-wheel with which it is to be used; secondly, that by the action of the ball at each full rotation of the wheel the ring is shifted by the ball, and thereby the number of rotations accurately determined, and, thirdly, that the construction is comparatively simple, and protected in a reliable and effective manner against the action of dust and rain.

Having thus described my invention, I claim as new and desire to secure by Letters Patent—

1. An odometer composed of a ring-shaped casing or shell, a shifting ring in said casing, a ball interposed between said ring and the inner circumference of the casing, and a counting device operated by the shifting movements of the ring, substantially as set forth.

2. An odometer composed of a ring-shaped casing or shell, a shifting ring located in said casing, a weighted ball interposed between the ring and the inner circumference of the casing, an arm attached to the ring and fulcrumed to the casing, and a counting device operated by the shifting ring, and a pawl-and-ratchet device interposed between the oscillating arm and the counting device, substantially as set forth.

In testimony that I claim the foregoing as my invention I have signed my name in presence of two subscribing witnesses.

JOHN PAOLI.

Witnesses:
 PAUL GOEPEL,
 MARTIN PETRY.